US010417337B2

(12) United States Patent
Dusberger et al.

(10) Patent No.: US 10,417,337 B2
(45) Date of Patent: Sep. 17, 2019

(54) DEVICES, SYSTEMS, AND METHODS FOR RESOLVING NAMED ENTITIES

(71) Applicant: CANON KABUSHIKI KAISHA, Tokyo (JP)

(72) Inventors: Dariusz T. Dusberger, Irvine, CA (US); Quentin Dietz, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 15/253,548

(22) Filed: Aug. 31, 2016

(65) Prior Publication Data
US 2017/0060837 A1 Mar. 2, 2017

Related U.S. Application Data

(60) Provisional application No. 62/213,535, filed on Sep. 2, 2015.

(51) Int. Cl.
*G06F 17/27* (2006.01)
*G06F 16/31* (2019.01)
*G06F 16/35* (2019.01)

(52) U.S. Cl.
CPC .......... *G06F 17/278* (2013.01); *G06F 16/313* (2019.01); *G06F 16/35* (2019.01); *G06F 17/277* (2013.01)

(58) Field of Classification Search
None
See application file for complete search history.

(56) References Cited

U.S. PATENT DOCUMENTS

| 7,672,833 | B2 | 3/2010 | Blume | |
|---|---|---|---|---|
| 8,775,409 | B1 | 7/2014 | Mehta | |
| 9,047,283 | B1* | 6/2015 | Zhang | G06F 17/30663 |
| 2003/0130835 | A1 | 7/2003 | Azzam | |
| 2006/0136411 | A1* | 6/2006 | Meyerzon | G06F 17/30684 |
| 2007/0067285 | A1 | 3/2007 | Blume | |
| 2011/0320186 | A1 | 12/2011 | Butters | |
| 2013/0124524 | A1 | 5/2013 | Anderson | |

(Continued)

OTHER PUBLICATIONS

Joao Paulo Carvalho, Luisa Coheur; Introducing UWS—A Fuzzy Based Word SimilarityFunction with Good Discrimination Capability:Preliminary results; Jul. 2013; IEEE, Pages: all URL: https://ieeexplore.ieee.org/document/6622494/.*

(Continued)

*Primary Examiner* — Richa Mishra
(74) *Attorney, Agent, or Firm* — Canon U.S.A., Inc. IP Division

(57) ABSTRACT

An information processing apparatus to select a token from a document to describe a field of interest includes an obtaining unit, a determining unit, a clustering unit, and a selecting unit. The obtaining unit obtains a list of tokens output from extractors that received the document as an input. Each output token has an extractor score assigned to by an extractor. The determining unit determines, as a word frequency value, a frequency of each word in the list of tokens, determines a token score for each token in the list of tokens, and determines a distance between each token in the list of tokens. The clustering unit clusters each token in the list of tokens into a plurality of groups. The selecting unit selects a token with a group of the plurality of groups to describe the field of interest in the document.

8 Claims, 14 Drawing Sheets

(56) References Cited

U.S. PATENT DOCUMENTS

2015/0032645 A1     1/2015   McKeown
2015/0154284 A1     6/2015   Pfeifer

OTHER PUBLICATIONS

Bharat Pardeshi and Durga Toshniwal; Improved K-Medoids Clustering Based on Cluster Validity Index and Object Density; Mar. 2010; IEEE; Pages: all URL: https://ieeexplore.ieee.org/document/5422924/.*

Matthias Blume, "Automatic Entity Disambiguation: Benefits to NER, Relation Extraction, Link Analysis, and Inference." International Conference on Intelligence Analysis, Apr. 2005.

Joao Paulo Carvalho, "Introducing UWS—A Fuzzy Based Word Similarity Function with Good Discrimination Capability: Preliminary Results." May 2013.

"Eighteenth Conference on Computational Natural Language Learning." Jun. 2014.

Andrew T. Freeman, "Cross Linguistic Name Matching in English and Arabic: A "One to Many Mapping" Extension of the Levenshtein Edit Distance Algorithm." Proceedings of the Human Language Technology Conference of the North American Chapter of the ACL (HLT-NAACL), pp. 471-478, publisher—Association for Computational Linguistics Stroudsburg, PA, USA, Jun. 2006.

Marcus Klang et al., "Named Entity Disambiguation in a Question Answering System." The Fifth Swedish Language Technology Conference (SLTC) 2014.

Alireza Mansouri et al., "Named Entity Recognition Approaches." International Journal of Computer Science and Network Security (IJCSNS), vol. 8 No. 2, Feb. 2008.

Alireza Mansouri et al., "Named Entity Recognition Using a New Fuzzy Support Vector Machine." International Journal of Computer Science and Network Security (IJCSNS ), vol. 8 No. 2, Feb. 2008.

Duangmanee Putthividhya et al., "Bootstrapped Named Entity Recognition for Product Attribute Extraction." Proceedings of the 2011 Conference on Empirical Methods in Natural Language Processing, pp. 1557-1567, Jul. 2011.

Giuseppe Rizzo et al., "Making Sense of Microposts (#Microposts2015) Named Entity Recognition & Linking Challenge." Conference: Microposts workshop of ACM WWW, May 2015.

Maria Skeppstedt et al., "Automatic Recognition of Disorders, Findings, Pharmaceuticals and Body Structures From Clinical Text: An Annotation and Machine Learning Study." Journal of Biomedical Informatics 49 (2014) 148-158, Feb. 2014.

Valentin Jijkoun, "Named Entity Normalization in User Generated Content." Proceedings of the Second Workshop on Analytics for Noisy Unstructured Text Data. 2008, pp. 23-30, Association for Computing Machinery (ACM), New York, NY, USA.

Takehito Utsuro, "Combining Outputs of Multiple Japanese Named Entity Chunkers by Stacking." Proceedings of the ACL-02 conference on Empirical methods in natural language processing, 2002, pp. 281-288, vol. 10, Association for Computational Linguistics Stroudsburg, PA, USA.

Sriparna Saha, "Combining Multiple Classifiers Using Vote Based Classifier Ensemble Technique for Named Entity Recognition." Data & Knowledge Engineering (journal), May 2013, pp. 15-39, vol. 85, Elsevier Science Publishers B. V. Amsterdam, The Netherlands.

Eduardo Ferreira, "Combining Rule-based and Statistical Methods for Named Entity Recognition in Portuguese." Actas da 5" Workshop em Tecnologia da Informação e da Linguagem Humana, 2007.

* cited by examiner

LIST OF TOKENS 330

| | | |
|---|---|---|
| .3 ABBC | .6 MNO | .9 XYZ Inc. |
| .9 ABC Inc. | .4 ABC Ltd | .5 MNO Corp |
| .5 XYZ Ltd | .2 XYZ | .5 ABC |

FIG. 5

| FREQUENCY OF WORD IN LIST ||
|---|---|
| WORD | FREQUENCY |
| ABBC | 1/14 = 0.07 |
| ABC | 3/14 = 0.21 |
| CORP | 1/14 = 0.07 |
| Inc. | 2/14 = 0.14 |
| Ltd | 2/14 = 0.14 |
| MNO | 2/14 = 0.14 |
| XYZ | 3/14 = 0.21 |

FIG. 8

| TOKEN SCORE |||
|---|---|---|
| Token | $\sum_{i=1}^{length} \frac{wf_i}{i} * w$ | Token Score |
| .3 ABBC | [(1/14)/1](0.3) | 0.02 |
| .5 ABC | [(3/14)/1](0.5) | 0.11 |
| .9 ABC Inc. | [((3/14)/1)+((2/14)/2)](0.9) | 0.26 |
| .4 ABC Ltd | [((3/14)/1)+((2/14)/2)](0.4) | 0.11 |
| .6 MNO | [(2/14)/1](0.6) | 0.09 |
| .5 MNO Corp | [((2/14)/1)+((1/14)/2)](0.5) | 0.09 |
| .2 XYZ | [(3/14)/1](0.2) | 0.04 |
| .9 XYZ Inc. | [((3/14)/1)+((2/14)/2)](0.9) | 0.26 |
| .5 XYZ Ltd | [((3/14)/1)+((2/14)/2)](0.5) | 0.14 |

FIG. 9

DISTANCE BETWEEN TOKENS

| | .3 ABBC | .5 ABC | .9 ABC Inc. | .4 ABC Ltd | .6 MNO | .5 MNO Corp | .2 XYZ | .9 XYZ Inc. | .5 XYZ Ltd |
|---|---|---|---|---|---|---|---|---|---|
| .3 ABBC | 0 | 57.14 | 71.43 | 71.43 | 42.86 | 50.00 | 57.14 | 71.43 | 71.43 |
| .5 ABC | 57.14 | 0 | 0.22 | 0.22 | 71.43 | 78.57 | 85.71 | 100.00 | 100.00 |
| .9 ABC Inc. | 71.43 | 0.22 | 0 | 0.89 | 85.71 | 114.29 | 100.00 | 2.00 | 142.86 |
| .4 ABC Ltd | 71.43 | 0.22 | 0.89 | 0 | 85.71 | 114.29 | 100.00 | 142.86 | 2.00 |
| .6 MNO | 42.86 | 71.43 | 85.71 | 85.71 | 0 | 0.17 | 71.43 | 85.71 | 85.71 |
| .5 MNO Corp | 50.00 | 78.57 | 114.29 | 114.29 | 0.17 | 0 | 78.57 | 114.29 | 114.29 |
| .2 XYZ | 57.14 | 85.71 | 100.00 | 100.00 | 71.43 | 78.57 | 0 | 0.22 | 0.22 |
| .9 XYZ Inc. | 71.43 | 100.00 | 2.00 | 142.86 | 85.71 | 114.29 | 0.22 | 0 | 0.89 |
| .5 XYZ Ltd | 71.43 | 100.00 | 142.86 | 2.00 | 85.71 | 114.29 | 0.22 | 0.89 | 0 |

LOCATION OF TOKEN

| Dimension / Token | ABBC | ABC | CORP | Inc. | Ltd | MNO | XYZ |
|---|---|---|---|---|---|---|---|
| .3 ABBC | 1/14 | 0 | 0 | 0 | 0 | 0 | 0 |
| .5 ABC | 0 | 3/14 | 0 | 0 | 0 | 0 | 0 |
| .9 ABC Inc. | 0 | 3/14 | 0 | 2/14 | 0 | 0 | 0 |
| .4 ABC Ltd | 0 | 3/14 | 0 | 0 | 2/14 | 0 | 0 |
| .6 MNO | 0 | 0 | 0 | 0 | 0 | 2/14 | 0 |
| .5 MNO Corp | 0 | 0 | 1/14 | 0 | 0 | 2/14 | 0 |
| .2 XYZ | 0 | 0 | 0 | 0 | 0 | 0 | 3/14 |
| .9 XYZ Inc. | 0 | 0 | 0 | 2/14 | 0 | 0 | 3/14 |
| .5 XYZ Ltd | 0 | 0 | 0 | 0 | 2/14 | 0 | 3/14 |

CLUSTER SCORE

| NO. | Token Cluster | $\sum_{i=1}^{count} \dfrac{TokenScore\ (TS_i)}{(1 + Dist\ (T,C))}$ | Cluster Score |
|---|---|---|---|
| (i) | C = .3 ABBC | 0.02/(1+0) | 0.02 |
| (ii) | C = .5 ABC<br><br>.9 ABC Inc.<br><br>.4 ABC Ltd | 0.11/(1+0)<br>+<br>0.26/(1+0.22)<br>+<br>0.11/(1+0.22) | 0.41 |
| (iii) | C = .6 MNO<br><br>.5 MNO Corp | 0.09/(1+0)<br>+<br>0.09/(1+0.17) | 0.16 |
| (iv) | C = .2 XYZ<br><br>.9 XYZ Inc.<br><br>.5 XYZ Ltd | 0.04/(1+0)<br>+<br>0.26/(1+0.22)<br>+<br>0.14/(1+0.22) | 0.37 |

FIG. 14

DEVICES, SYSTEMS, AND METHODS FOR RESOLVING NAMED ENTITIES

CROSS-REFERENCE TO RELATED APPLICATIONS

This application claims the benefit of U.S. Provisional Application No. 62/213,535, which was filed on Sep. 2, 2015 and is hereby incorporated by reference in its entirety.

BACKGROUND

Technical Field

This application generally relates to computer recognition of named entities in the text of a document.

Background

Natural language processing includes information extraction (IE) as a computer based task of automatically extracting structured information from unstructured and/or semi-structured machine-readable documents. In Information extraction, named entities are real world objects, such as organizations, persons, locations, and products that can be denoted with a proper name. Named entity recognition (NER) is that part of information extraction which uses named entity extractors to locate and classify named entities in text into pre-defined categories, such as organizations, the names of persons, locations, expressions of times, quantities, monetary values, and percentages.

At present, there exist conventional techniques related to named entity extractors which seek to provide a better result set. Conventional techniques address a set of data annotated by one NER model and address combing multiple NER models. Techniques related to combing multiple NER models tend to focus on how to use multiple named entity recognition techniques to have better precision/recall in order to identity various entities.

For a given a set of data annotated by one NER model, conventional techniques look to determine how to resolve which entities reference the same entity (i.e., that Bush and George Bush both reference the same person). In other words, given a set of extracted named entities from a document and comments, find all references to the same entity. In this regard, English Wikipedia policy on article titles provides standards for naming article titles in a recognizable, concise, and natural way that is precise and consistent and provides redirects to article titles that are less than this. For a set of data annotated by one NER model, some conventional techniques are dependent on a Wikipedia reference to find which variation of the entity name is the most accurate.

Conventional techniques also look to combine multiple NER models to obtain a more accurately annotated results. For example, given a token in a document (such as a "Party To Contract"), conventional techniques try to solve whether a given name entity is a desired name entity to extract by combining multiple NER models. However, this requires outputting all references to the "Party To Contract" rather than attempting to output a single answer such as where a user desires to determine a particular "Party To Contract" in a contract.

SUMMARY

According to an aspect of the present invention, an information processing apparatus to select a token from a document to describe a field of interest in the document includes an obtaining unit configured to obtain a list of tokens output from a plurality of extractors that received the document as an input, wherein each output token has an extractor score assigned to by an extractor of the plurality of extractors, a determining unit configured to determine, as a word frequency value, a frequency of each word in the list of tokens, determine a token score for each token in the list of tokens, and determine a distance between each token in the list of tokens, a clustering unit configured to cluster each token in the list of tokens into a plurality of groups, and a selecting unit configured to select a token with a group of the plurality of groups to describe the field of interest in the document.

Further features of the present invention will become apparent from the following description of exemplary embodiments with reference to the attached drawings.

BRIEF DESCRIPTION OF THE DRAWINGS

FIG. 5 illustrates a list of tokens 330.

FIG. 8 illustrates the frequency with which each word in the list of tokens 330 appears in the list of tokens 330.

FIG. 9 illustrates the token score for each token in the list of tokens 330.

FIG. 11 illustrates a result of performing method 1000 on the tokens in the list of tokens 330 in FIG. 5 to determine the distance between two tokens.

FIG. 13 illustrates the plot points for the tokens in the list of tokens 330.

FIG. 14 illustrates token clusters added to the ready-queue at step S1220 and the score for each cluster.

DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Embodiments may be implemented by an information processing apparatus that uses, as an input, the output of many named entity recognition (NER) models to determine which name entities reference the same name entity and, the set of those name entities which reference the same name entity, which variation in the set is the most appropriate to be returned as the one string that best represents the set. In other words, given a document, embodiments determine which string is the desired entity to extract. For example, in a particular contract, embodiments may determine what company listed in a contract is the "Party To Contract" and which date is the effective date of the contract. Embodiments work towards outputting a single answer—there is only one "Party To Contract" in a contract—as the most accurate representation of the entity without finding all references to the "Party to the Contract" and without being dependent on a third party standard such as Wikipedia. In finding which string best represents a set of related entities, figuring out what entities are actually referencing the same entity is a subset of embodiments.

Figure 1:
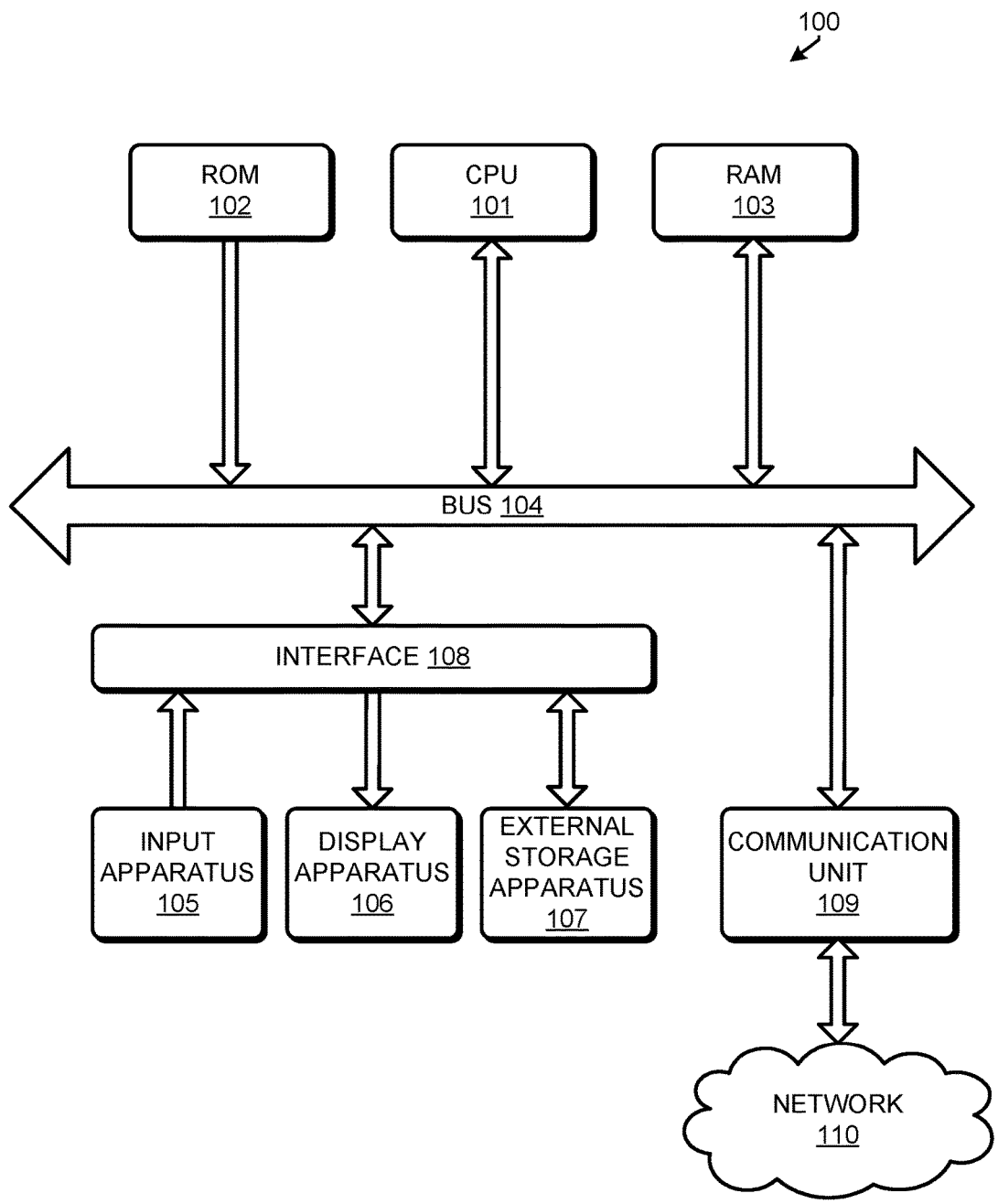
FIG. 1 illustrates a hardware configuration example of an information processing apparatus (computer).

FIG. 1 illustrates a hardware configuration example of an information processing apparatus (computer) 100. Information processing apparatus 100 may be utilized to locate named entities in the text of a document. A central processing unit (CPU) 101 of the information processing apparatus 100 executes a processing based on an operating system (OS) and various programs to control the respective units of the information processing apparatus. A read-only memory (ROM) 102 stores static data among the programs executed by the CPU 101 and stores parameters for computations. A random-access memory (RAM) 103 is utilized as a work area for the CPU 101 and as a temporary storage area of data. The ROM 102 and the RAM 103 are connected via a bus 104 to the CPU 101. An input apparatus 105, such as a keyboard or a touch panel, a display apparatus 106, such as a cathode ray tube (CRT) or a liquid crystal display, and an external storage apparatus 107 such as a hard disk apparatus or a Compact Disc Read-Only Memory (CD-ROM), are connected via an interface 108 to the bus 104. In addition, the bus 104 is connected via a communication unit 109 to a network 110, which may be a telecommunications network which allows computers to exchange data. It is noted that the CPU 101 executes the processing based on the operating system and the various programs.

Figure 2:
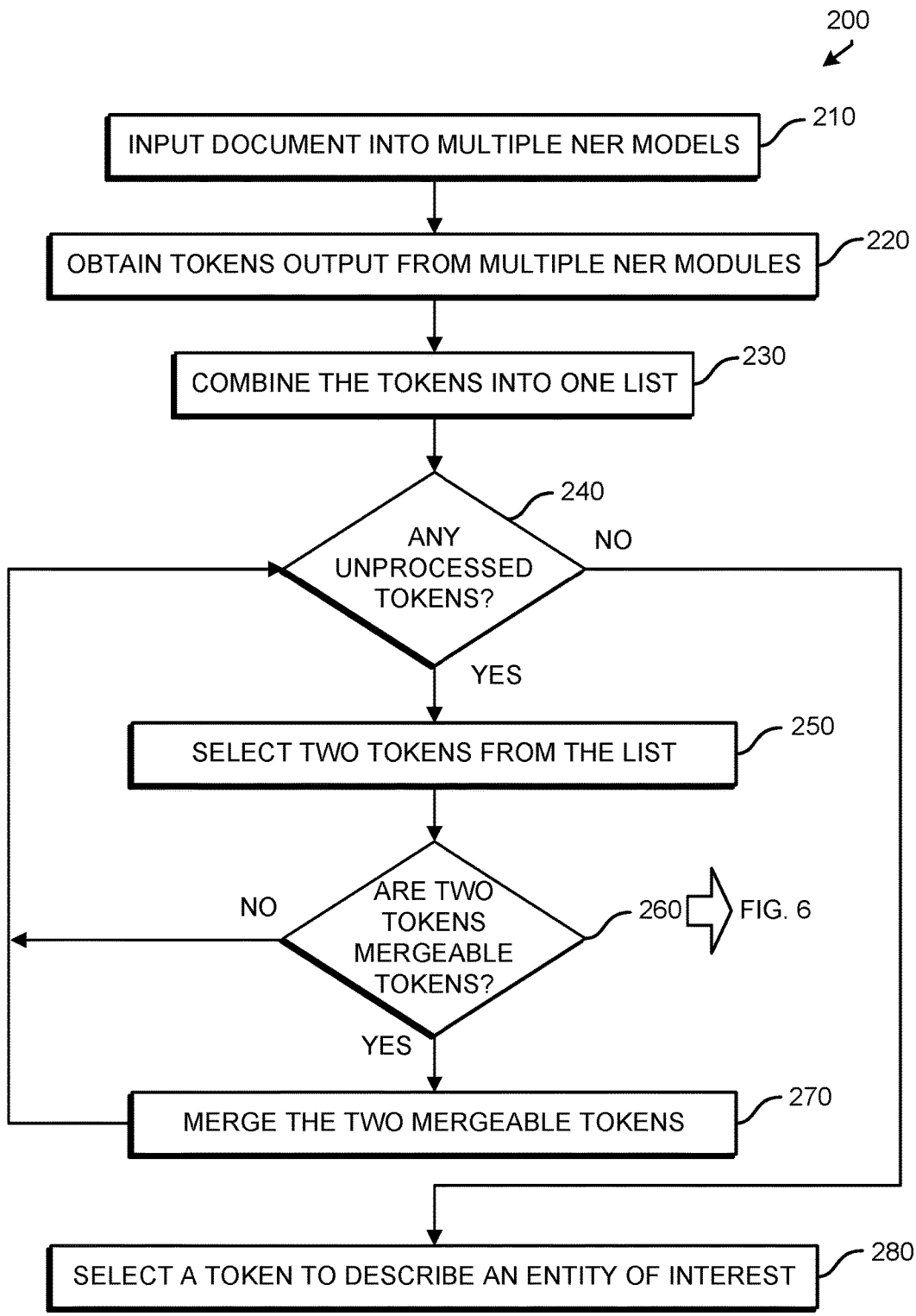
FIG. 2 illustrates, as a first embodiment, a method 200 to select a token to describe an entity of interest.
Figure 3:
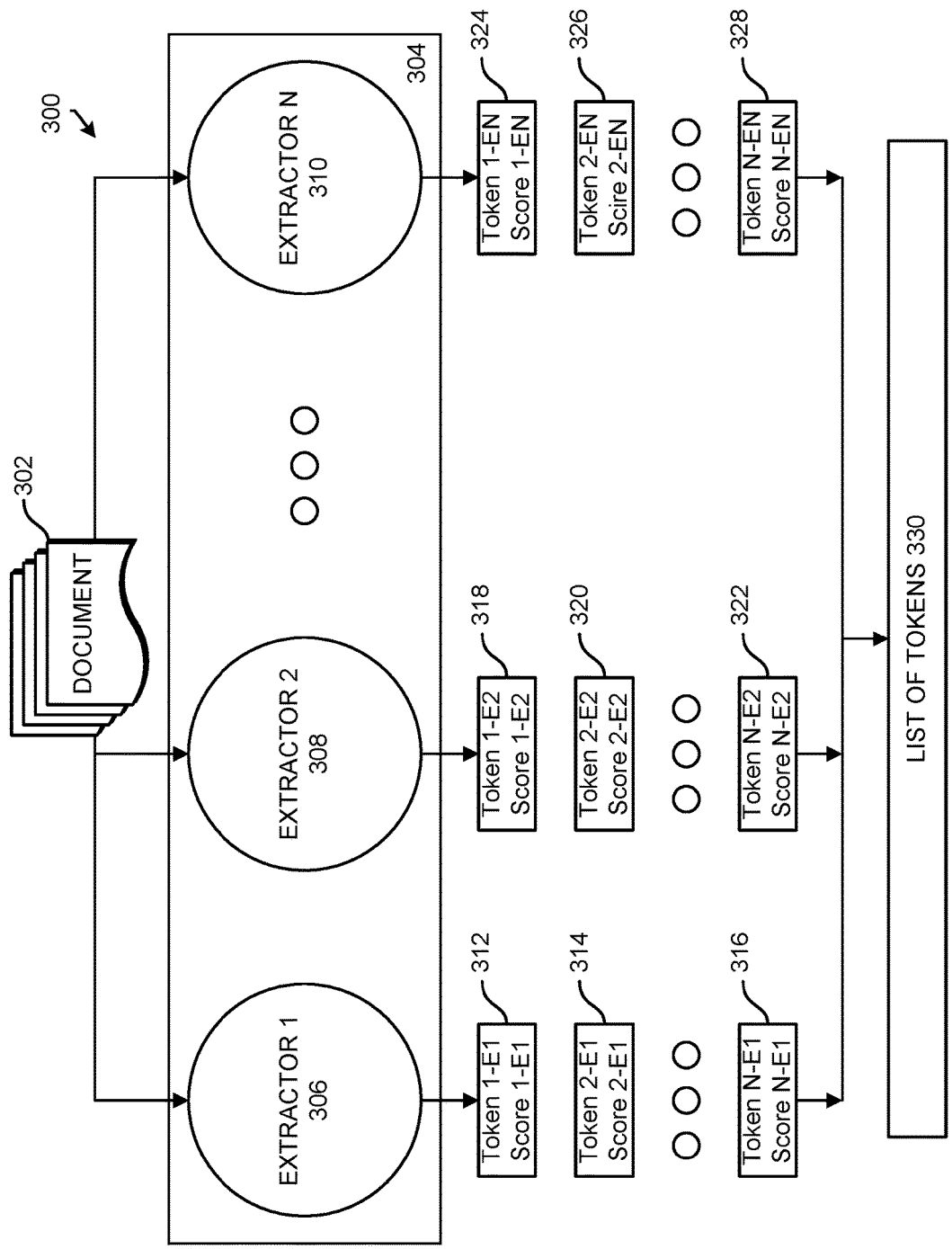
FIG. 3 illustrates a system 300 to process a document 302 into a list of tokens 330.

FIG. 2 illustrates, as a first embodiment, a method 200 to select a token to describe an entity of interest within a document. FIG. 3 illustrates a system 300 to process a document 302 into a list of tokens 330. At step S210 in FIG. 2, the document 302 of FIG. 3 is input into a set 304 of named entity recognition (NER) modules. The document 302 may be a contract for services and/or products, a book, written opinions of judges, the Congressional Record, a transcription of a presentation, or any recorded representation of information, intentions, and/or activities. Typically, the document 302 will have been passed through an optical character recognition device and be in an electronic form having characters that can be read by the NER module set 304. For example, the document 302 may be Portable Document Format (PDF), Office, or a plain text document.

The NER module set 304 may include extractors 306, 308, and 310. Extractors 306, 308, and 310 are recognizers configured to locate and classify items in the text of the document 302 into pre-defined categories/fields. Prior to the document 302 being input to the extractors 306, 308, and 310, extractors 306, 308, and 310 are programmed to look in a particular field to locate items in the document text that fall within the given field. For example, the rules of each extractor 306, 308, and 310 may be pre-programmed to search the document 302 for the name of a judge, effective date of the document, or the name of the outside party to a contract where the inside party to the contract is known by the operators of the extractor set 304. When the extractors 306, 308, and 310 are pre-programmed to look for real world object that can be denoted with a proper name, extractors 306, 308, and 310 may be thought of as named entity extractors.

Each extractors 306, 308, and 310 may be produced by a different company or have its own unique internal operations. For example, extractor 306 may be an Apache OpenNLP (natural language processing) module, extractor 308 may be a Stanford CoreNLP module, and extractor 310 may be a Reyex natural language processing module. Each model of extractor has strengths and weaknesses that balance precision, noise, and recall. Information extracted by the NER module set 304 may be used to populate fields in a table that is displayed as a page on the display apparatus 106. For example, if a law firm receives hundreds of documents 302 in reply to a discovery request, each document may be passed through the extractors 306, 308, and 310 to obtain text that may be used to populate an electronic intake form for a given document. A goal is to find the most likely and best representative example to populate each field of each intake form.

Passing the document 302 through each extractor 304 at step S210 results in one or more tokens 312-328. The tokens output from the NER module set 304 are obtained in step S220 of FIG. 2. The particular extractor from the NER module set 304 assigns each token a confidence score based on how close the extractor 304 predicts the token is to representing the searched-for field. Since each model of extractor has strengths and weaknesses that balance precision, noise, and recall, one extractor may assign a score to a token that is different from a score assigned by another extractor to that same token.

Figure 4:
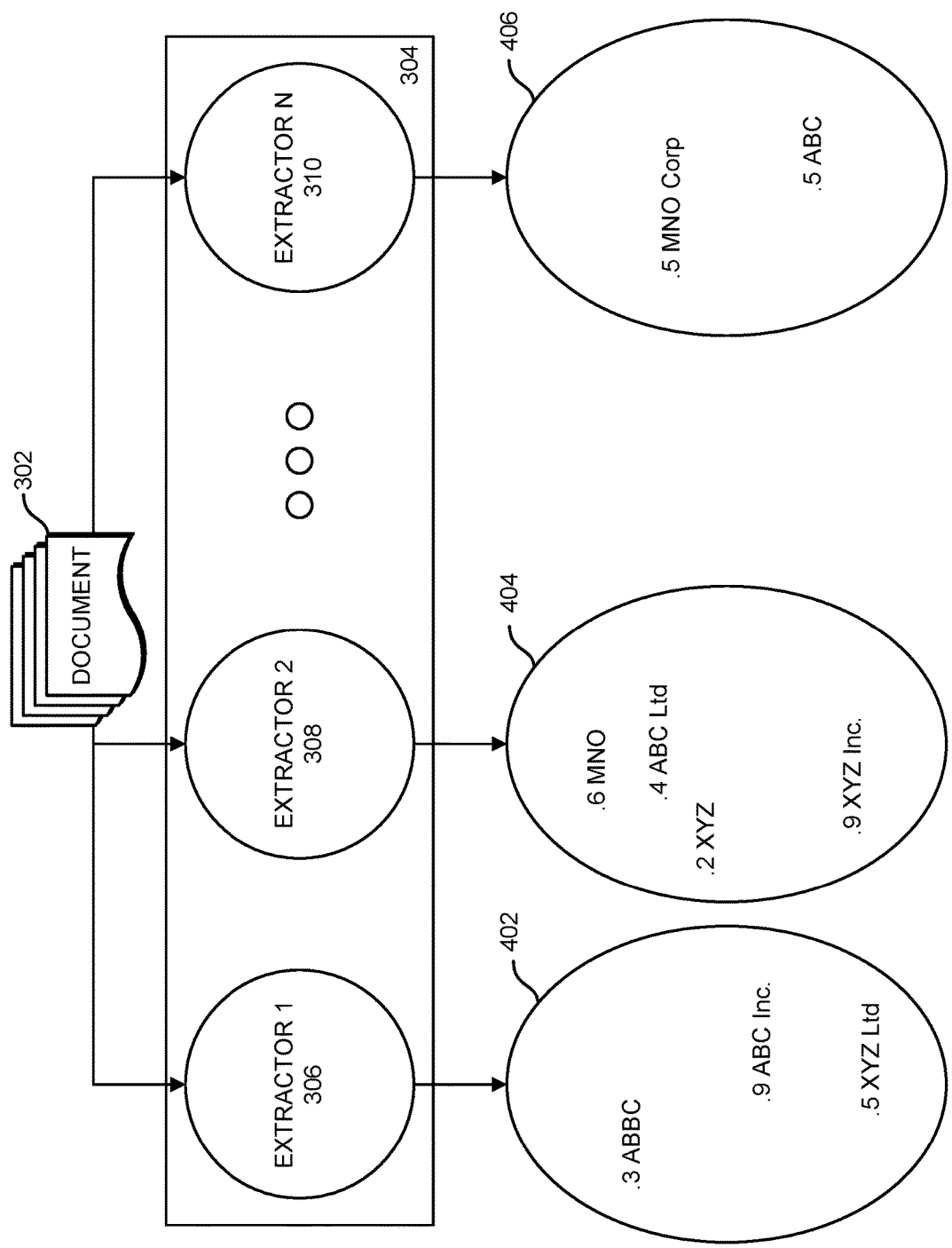
FIG. 4 is an example output of the NER module set 304.

In an example, suppose the document 302 is a contract for services between two parties and one of the parties to the contract runs the document 302 through extractor set 304 to electronically acquire the name of the outside party to the contract and populate an intake form for that document with the outside party name. FIG. 4 is an example output of the NER module set 304. The extractors in the NER module set 304 may use either statistical and/or heuristics methods to extract information from document. After this, the extractor set 304 to look for the name of the outside party to the contract and passing the document 302 through extractor set 304, the output may be a token set 402, a token set 404, and a token set 406 as illustrated in FIG. 4. Since the text of the contract for services may have a variety of named entities that may or may not be a signor of the contract, each token set may include various name entitles. Token set 402, for example, includes versions of named entities ABC and XYZ. Each token within the token set 402 may be assigned a score between 0.0 and 1.0 by the extractor 306 that represents, in some cases, a probability that the particular token is the name of the outside party to the contract. The extractor 306 similarly may assign a score to each token in token set 404 and the extractor 308 may assign a score to each token in token set 406.

At step S230, tokens in each token set 402, 404, and 406 are combined into one list of tokens 330. FIG. 5 illustrates a list of tokens 330. The list of tokens 330 illustrated in FIG. 5 includes each token of FIG. 4 associated with the score assigned to the token by the extractor producing the token.

Steps S240 through S280 of method 200 in FIG. 2 work towards selecting a token from the list of tokens 330 to describe an item of interest. In the present example, steps S240 through S280 work towards selecting a token from the list of tokens 330 that is the most likely and best representation of the name of the outside party to the contract. Steps S240 through S280 resolve which entities reference the same entity and, of those, which variation is the most appropriate to be returned as the name of the outside party to the contract. That is to say, method 200 works towards finding which entity string best represents a set of related entities. In addition, rather than be dependent on an external reference such as Wikipedia to find which variation is the most accurate, steps S240 through S280 are a standalone way to find the most accurate representation of the entity. The returned name of the outside party to the contract then may be use to populate an outside-party-to-the-contract field in a table for display as a page on the display apparatus 106.

At step S240, the method 200 determines whether there are any tokens from the list of tokens 330 that have not been processed. At step S250, the method 200 selects two unprocessed tokens from the list of tokens 330. As the first selected token, the method 200 may select a token with the highest score. In the example illustrated in FIG. 5, the token ABC Inc. having 0.9 as a score has a highest score from the list of tokens 330 and is selected as the first selected token at step S250. Multiple second tokens are selected one at a time as part of an iterative process. The method 200 determines at step S260 whether the two selected tokens are mergeable tokens. As discussed in more detail below, two tokens are considered mergeable if their word tokenized form is a fuzzy sub/super list of one another. Each of the remaining unprocessed tokens will be selected, one at a time, as the second selected token to determine at step S260 whether the two selected tokens are mergeable tokens.

Figure 6:
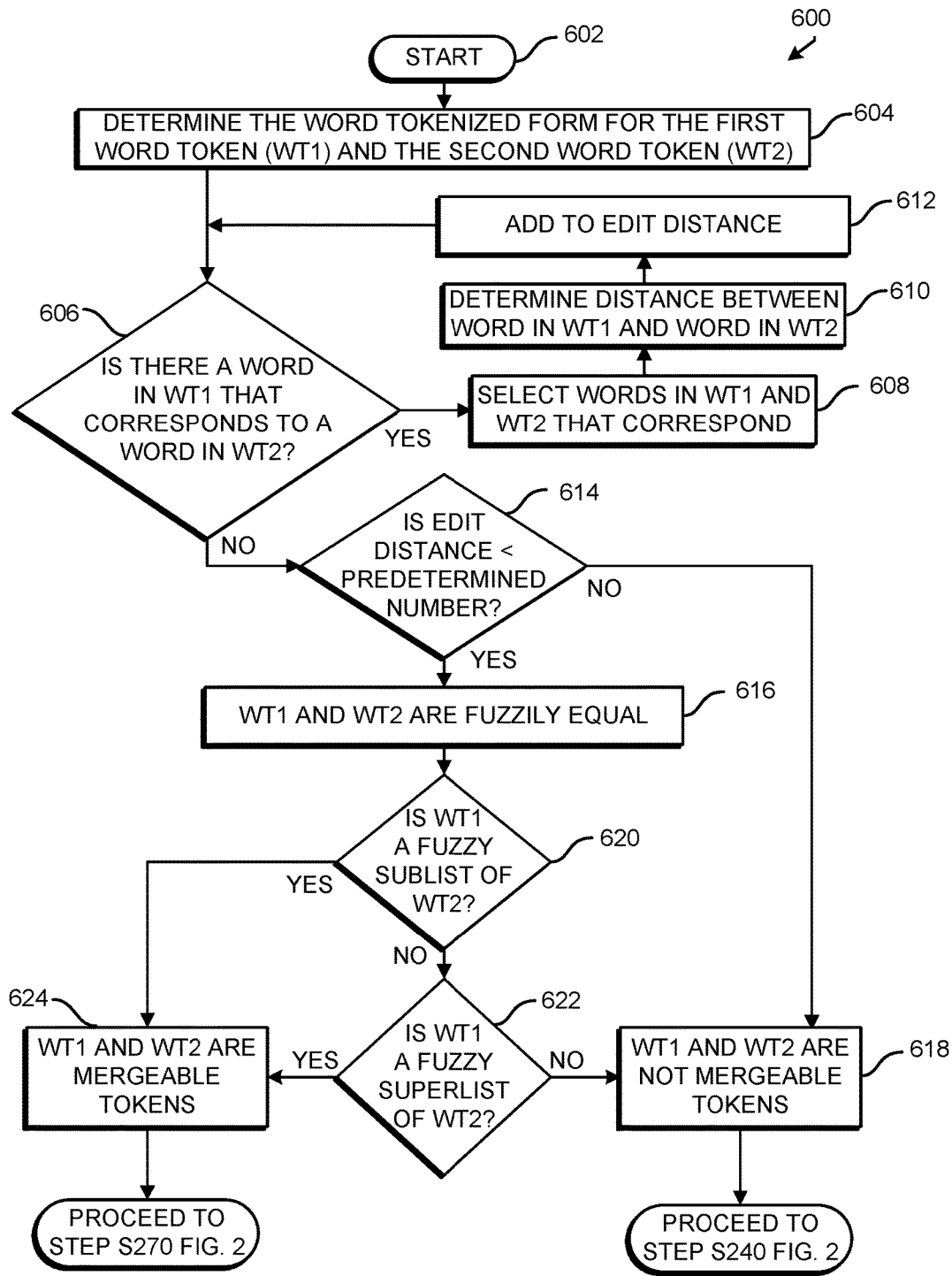
FIG. 6 is a method 600 to determine at step S260 whether two tokens are mergeable tokens.

FIG. 6 is a method 600 to determine at step S260 whether two tokens are mergeable tokens. Tokens are strings spanning one or more words which potentially represent a desired entity to extract. The method 600 starts at step S602. Recall that tokens are considered mergeable if their word tokenized form is a fuzzy sub/super list of one another. At step S604, the method 600 determines the word tokenized form of each token—first word token (WT1) and second word token (WT2)—selected at step S250.

The word tokenized form of a token is a list of words which compose that token. In other words, each extracted token (Entity) is represented by a token feature $F_i$ which is constructed by tokenizing each token (extracted Entity) into a set of words. For example, the token "San Francisco Stat" is transformed into the list: $F_i$=["San", "Francisco", "Stat"] and the token "San Francisco State University" is transformed into the list: $F_2$=["San", "Francisco", "State", "University"]. Along with ABC Inc. selected as WT1, assume that "0.5 ABC" is the second token with score selected at step S250. The word tokenized form for WT1 ABC Inc. is ["ABC", "Inc."] and the word tokenized form for WT2 ABC is ["ABC"].

At step S606, the method 600 determines whether there is a word in the tokenized form for WT1 having a position that corresponds to a position of a word in the tokenized form for WT2. In the example with WT1=["San", "Francisco", "Stat"] and WT2=["San", "Francisco", "State", "University"], the first positioned word "San" in WT1 has a corresponding first position word in WT2, namely "San". In the example with WT1=[ABC", "Inc."] and WT2=["ABC"], the first positioned word "ABC" in WT1 has a corresponding first position word in WT2, namely "ABC".

At step S608, the position corresponding words in WT1 and WT2 are selected. In step S610, the method 600 then determines the distances between the two selected words. In one example, step S610 utilizes the Levenshtein Distance between the two words to determine an edit distance. The Levenshtein Distance between the two words is the minimum number of single-character edits (i.e. insertions, deletions or substitutions) required to change one word into the other. In the example with WT1=["San", "Francisco", "Stat"] and WT2=["San", "Francisco", "State", "University"], the Levenshtein Distance between "San" in WT1 and "San" in WT2 is zero. When the words "Stat" and "State" are reached at step S608, the Levenshtein Distance between "Stat" and "State" determined at step S608 is one. In other words, it can be seen that both words "San"—"San" and "Francisco"-"Francisco" match exactly. However, "State" and "Stat" do not. Computing the word Levenshtein Distance for "State" and "Stat" finds that the minimum number of single-character edits required to change Stat into State is equal to one. At step S612, the amount determined at step S610 is added to an edit distance.

In the example with WT1=[ABC", "Inc."] and WT2=["ABC"], the second positioned word is "Inc." and there is no second positioned word in WT2. In the example with WT1=["San", "Francisco", "Stat"] and WT2=["San", "Francisco", "State", "University"], there is no fourth positioned word in WT1 whereas "University" is the fourth positioned word in WT2. In other words, WT2 has the word token "University" whereas WT2 has nothing in the corresponding position. While the Levenshtein Distance between the two tokens "San Francisco Stat" and "San Francisco State University" is twelve, the method 600 only compares words to position corresponding words since, as discussed below, the method 600 looks to determine whether word tokenized forms are fuzzy sub/super list of one another. Thus, in this example, the edit distance between "San Francisco Stat" and "San Francisco State University" is one, not twelve.

At step S614, the method 600 determines whether the determined edit distance between WT1 and WT2 is less than a predetermined number. If the determined edit distance between WT1 and WT2 is less than a predetermined number, the two strings are defined at step S616 as being fuzzily equal. In other words, two strings are defined as being fuzzily equal if their Levenshtein Distance excluding added tokens is below a configurable number. This number may be relative to the minimum length of the two strings.

In the above examples, the word Levenshtein Distance between words in WT1=[ABC", "Inc."] and WT2=["ABC"] is zero and the word Levenshtein Distance between words in WT1=["San", "Francisco", "Stat"] and WT2=["San", "Francisco", "State", "University"] is one. If WT1=[ABC", "Inc."] and WT2=["MNO", "Corp"], the word Levenshtein Distance between the words in each token seven. If the determined edit distance between WT1 and WT2 is not less than the predetermined number (NO at step S614), the method proceeds to step S618 where WT1 and WT2 are determined not to be mergeable tokens.

Recall that tokens are considered mergeable if their word tokenized form is a fuzzy sub/super list of one another. At step S620, the method 600 determines whether WT1 is a fuzzy sublist of WT2. If not, then the method 600 determines at step S622 whether WT1 is a fuzzy superlist of WT2. Tokens are fuzzy sub/super lists of one another if their word tokenized forms are fuzzy sub/super sets of one another. In the case where WT1=["San", "Francisco", "Stat"] and WT2=["San", "Francisco", "State", "University"], WT1 is a fuzzy sublist of WT2 since only the word "University" is missing from WT1. In the case where WT1=[ABC", "Inc."] and WT2=["ABC"], WT1 is not a fuzzy sublist of WT2 (NO at step S620). However, WT1 not a fuzzy superlist of WT2 (YES at step S622) since only the word "Inc." is missing from WT2.

If, after determining at step S616 that WT1 and WT2 are fuzzily equal to each other and determining at step S620 that WT1 is not a fuzzy sublist of WT2, it is determined at step S622 that WT1 and WT2 are not fuzzy super lists of one another, then it is determined at step S618 that WT1 and WT2 are not mergeable tokens. When it is determined at step S618 that two tokens are not mergable tokens, it is determined at step S260 of FIG. 2 that the two tokens are not mergable tokens. The method 200 then proceeds from step S260 in FIG. 2 to step S240. At step S240, another unprocessed token is selected and, at step S250, the token is selected as the next WT2 to be processed with WT1 0.9 ABC Inc. The token with score 0.9 ABC Inc. eventually is processed with each token with score in FIG. 5.

If, after determining at step S616 in FIG. 6 that WT1 and WT2 are fuzzily equal to each other, it is determined at step S620 or step S622 that WT1 and WT2 are sub/super lists of one another, then it is determined at step S624 that WT1 and WT2 are mergeable tokens. If it is determined at step S624 that WT1 and WT2 are mergeable tokens, then it is determined at step S260 of FIG. 2 that WT1 and WT2 are mergeable tokens. The method 200 then proceeds to step S270 of FIG. 2.

At step S270, WT1 and WT2 are merged. Once it is determined that two tokens should be merged, determining how to do so is critical to the goal of finding the token which best describes the sought after entity name. In order to merge two tokens at step S270, the score given to each token by the extractor producing the token is utilized in that the token with the highest score prevails. For example, if the first token is "ABC Inc." with the score of 0.9 given by the extractor 306 and the second token is "ABC" having the score of 0.5 given by the extractor 310, "ABC" is absorbed into "ABC Inc." since 0.5 is less than 0.9 so that only "ABC Inc." remains out of the two. The 0.5 score of the token "ABC" is then added to the 0.9 score of "ABC Inc." to give the token "ABC Inc." a score of 1.4. To resolve ties where the score of WT1 and WT2 are the same, three configurable options are available. For example, either the token with the most number of characters prevails, or the shorted token prevails, or a random picking happens. If both tokens are the same length, one token is picked at random and the other token is merged into the picked token.

From step S270, the method 200 returns to step S240. FIG. 5 illustrates nine tokens. Eventually, all nine tokens are processed as the first token WT1 and compared with the remaining tokens serving as the second token WT2. In an example, the tokens 0.3 ABBC, 0.9 ABC Inc., 0.4 ABC Ltd, and 0.5 ABC may be merge into the token ABC Inc. with a score of 2.1 (=0.3+0.9+0.4+0.5) for the token ABC Inc. The tokens 0.6 MNO and 0.5 MNO Corp may be merged into the token MNO and assigned a score of 1.1 for the token MNO and the tokens 0.5 XYZ Ltd, 0.2 XYZ, and 0.9 XYZ Inc. may be merged into the token XYZ Inc. and assigned a score of 1.6 for the token XYZ Inc.

After the method 200 determines at step S240 that there are no unprocessed tokens, the method proceeds to step S280. At step S280, the method 200 selects a token to describe an entity of interest. In the present example, the method 200 selects the one token that most likely is the name of the outside party to the contract. In reviewing the choices between 2.1 ABC Inc., 1.6 XYZ Inc., and 1.1 MNO, the method 600 selects ABC Inc. as the name of the outside party to the contract since its score of 2.1 is greater than the remaining scores of 1.6 and 1.1.

The approach of the first embodiment above has several benefits. For example, the method 200 automatically figures out which string best represents a desired entity type in contrast to the conventional art, which does not. Moreover, the method 200 can figures out which string best represents a desired entity type by using a combination of NER models. This allows for approaching entity extraction with numerous techniques.

Figure 7:
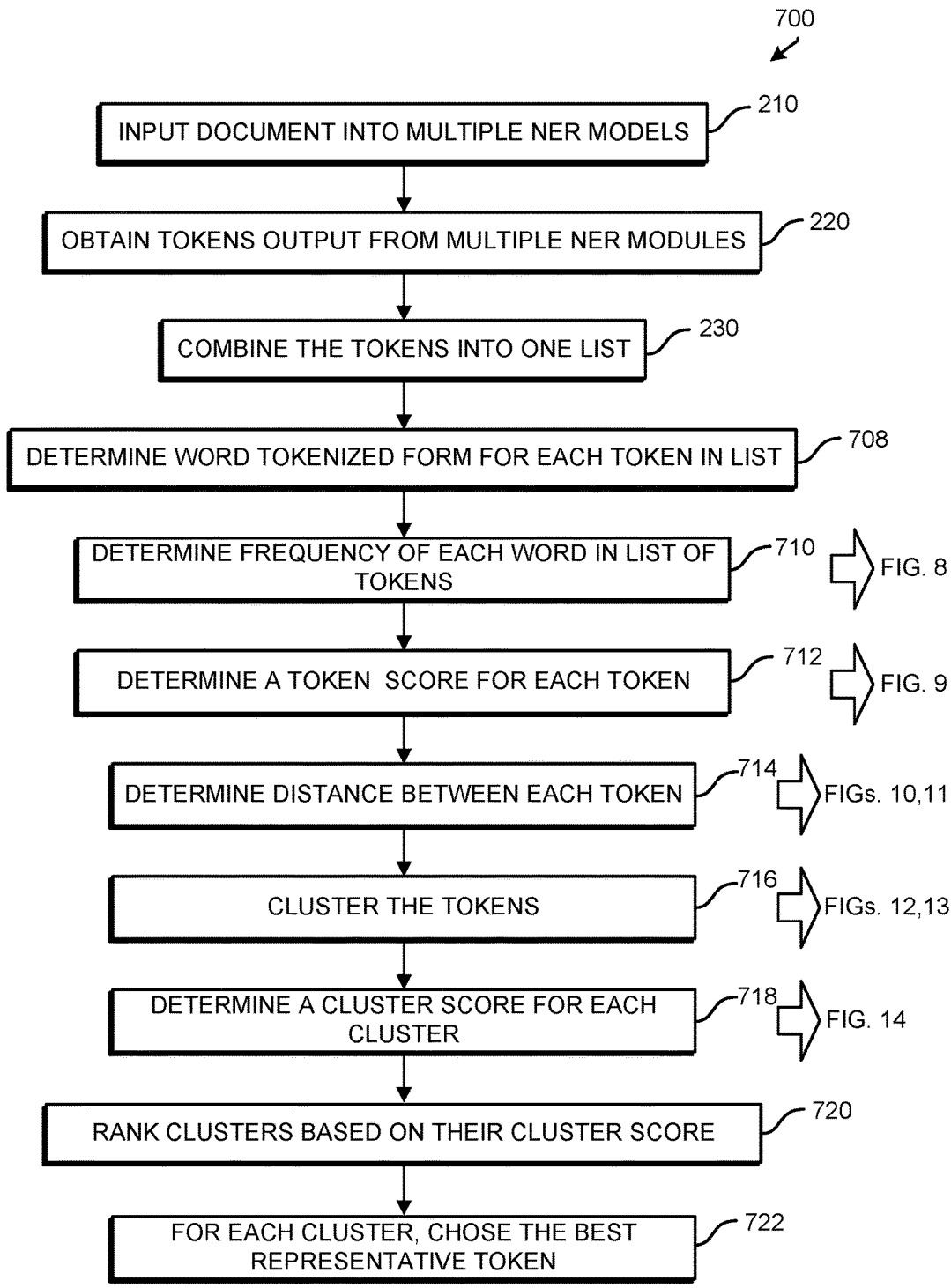
FIG. 7 illustrates, as a second embodiment, a method 700 to select a token to describe an entity of interest.

According to a second embodiment, an example is presented to select a token from a document to describe an entity of interest in that document. FIG. 7 illustrates, as a second embodiment, a method 700 to select a token to describe an entity of interest. The ranking by the method 700 involves (i) clustering tokens extracted by various NER models into sets based on their similarity to each other, (ii) ranking the resulting cluster sets based on scores of tokens that are members of that set, and (iii) choosing a representative token from one of the cluster sets. The second embodiment improves the accuracy of predicting the correct "Party to Contract" named entity over the first embodiment.

Method 700 has steps in common with the method 200 of FIG. 2 to output a list of tokens, such as the list of tokens illustrated FIG. 5. At step S210 in FIG. 7, the document 302 of FIG. 3 is input into a set 304 of named entity recognition (NER) modules. The tokens output from the NER module set 304 are obtained in step S220 in FIG. 7. The particular extractor 304 assigns each token a confidence score based on how close the extractor 304 predicts the token is to representing the searched-for field. At step S230 in FIG. 7, tokens in each token set 402, 404, and 406 of FIG. 4 are combined into one list of tokens 330 as illustrated in FIG. 5. Similar to step S604 of FIG. 6, step S708 of the method 700 determines the word tokenized form of each token, where the word tokenized form of a token is a list of words which compose that token.

The method 700 determines at step S710 the frequency with which each word in the list of tokens 330 appears in the list of tokens 330. FIG. 8 illustrates the frequency with which each word in the list of tokens 330 appears in the list of tokens 330. Within the nine tokens in the list of tokens 330, there are fourteen words. As illustrated in FIG. 8, seven of the fourteen words in the list of tokens 330 are unique to the list of tokens 330. For example, the word ABBC appears once among the fourteen words, the word ABC appears three times, and the word Inc. appears twice. The frequency with which each of the seven words appears in the list of tokens 330 is determined by dividing the number of times the word appears in the list of tokens 330 by the total number of words in the list of tokens 330. For example, the frequency of the word ABBC in the list of tokens 330 is one divided by fourteen, or 0.07.

In order perform clustering, a distance measure needs to compute the similarity (actually dissimilarity) between two tokens. The distance measure of the second embodiment takes into account the text-similarity as well as individual token's term frequencies.

The method 700 determines at step S712 the token score for each token in the list of tokens 330. FIG. 9 illustrates the token score for each token in the list of tokens 330. A token score is calculated by summing up scaled weights of a given token's words as determined by equation (i) below:

$$TokenScore(TS_k) = \sum_{i=1}^{length} \frac{wf_i}{i} * W \qquad (i)$$

where length is the number of words in the token, $wf_i$ is the word frequency weight for a given word, i is the location or position of a particular word within the given token, and w is the score/weight for a particular token assigned by the extractor 306, the extractor 308, or the extractor 310 of FIG. 4. The token score determined by equation (i) is designed to give a higher score to tokens that have words that occur more frequently, tokens starting with a higher weighted word ($wf_i$), tokens of greater length, and tokens with a higher score (w).

After step S712, the method 700 proceeds to step S714. At step S714, the method 700 determines the distance between each token. In one example, step S714 may utilize any distance measure such as Levenshtein Distance, Cosine Similarity, etc., to determining a distance between two tokens. However, the inventors determined a custom distance measure that produces higher quality results.

Figure 10:
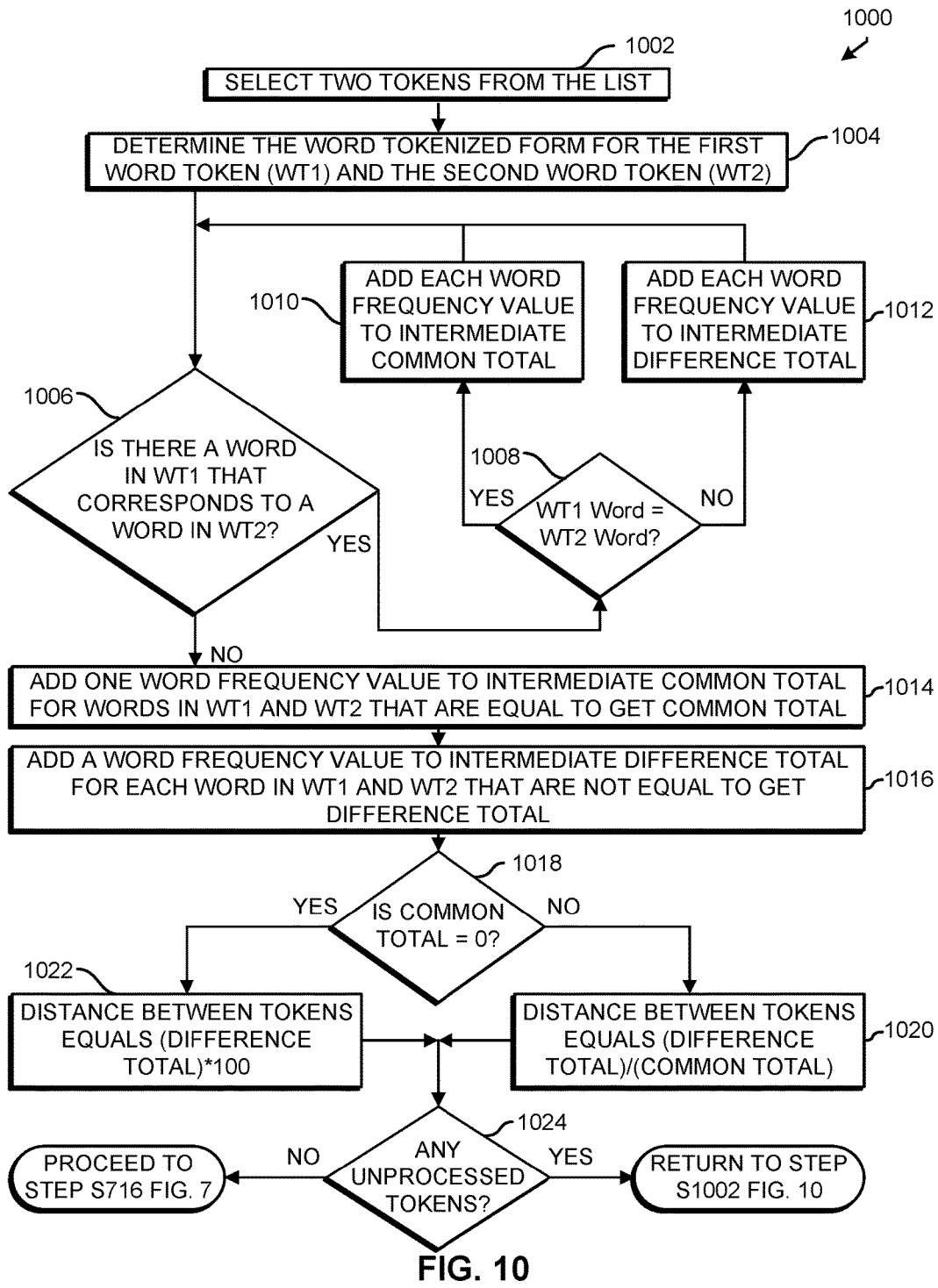
FIG. 10 is a method 1000 to determine the distance between two tokens in step S714 of FIG. 7.

FIG. 10 is a method 1000 to determine the distance between two tokens in step S714 of FIG. 7. FIG. 11 illustrates a result of performing method 1000 on the tokens in the list of tokens 330 in FIG. 5 to determine the distance between two tokens. Distance determined in step S714 is dependent on two circumstances. Where there are words in common between the two tokens selected in step S1002, the distance is expressed by equation (ii) below as a ratio of different to common word weights:

$$\text{Distance}(WT_i, WT_j) = (\text{different})/(\text{common}) \quad \text{(ii)}$$

where "different" is a sum of word weights that are different between tokens and "common" is a sum of word weights that are in common between tokens. Both common measure and different measure take into account word sequence/order as well as occurrence of words in the tokens being compared into account. If there are no words in common between the two tokens selected in step S1002, the distance is expressed as the different word weights multiplied by a constant C (for example C=100):

$$\text{Distance}(WT_i, WT_j) = (\text{different}) \quad \text{(iii)}$$

The method 1000 of FIG. 10 begins at step S1002 where two tokens are selected from the list of tokens 330—first word token (WT1) and second word token (WT2). At step S1004, the method 1000 determines the word tokenized form of each token WT1 and WT2 selected at step S1002. The processing at step S1004 is similar to the process performed at step S604 of FIG. 6. At step S1006, the method 1000 determines whether there is a word in the tokenized form for WT1 having a position that corresponds to a position of a word in the tokenized form for WT2. The processing at step S1006 is similar to the process performed at step S606 of FIG. 6.

In the present embodiment, assume, as a first example chosen at step S1002, that WT1 is ABC Ltd and WT2 is ABC Inc. As a second example chosen at step S1002, assume that WT1 is MNO Corp and WT2 is ABBC as in Table I below.

TABLE I

|  | Posn. 1 | Posn. 2 |
| --- | --- | --- |
| Ex. 1 |  |  |
| WT1 | ABC | Ltd |
| WT2 | ABC | Inc. |
| Ex 2 |  |  |
| WT1 | MNO | Corp |
| WT2 | ABBC |  |

If it is determined at step S1006 that there is a word in the tokenized form for WT1 having a position that corresponds to a position of a word in the tokenized form for WT2 (YES at step S1006), the method 1000 proceeds to step S1008. At step S1008, the method 1000 determines, word-by-word, whether the word in WT1 whose position corresponds to the word in WT2 equal each other. In the first example where WT1 is ABC Ltd and WT2 is ABC Inc., "ABC" in WT1 matches "ABC" in WT2. That is, "ABC" in WT1 is in common with "ABC" in WT2. Where the word in WT1 that corresponds to the word in WT2 equal each other (YES at step S1008), the method 1000 proceeds to step S1010. At step S1010, the word frequency value of each common word is added to an intermediate common total. Here, the word frequency value for the word "ABC" indicated in FIG. 8 as 0.21 (=3/14). The word frequency value 0.21 for "ABC" in WT1 and the word frequency value 0.21 for "ABC" in WT2 are added to the intermediate common total for a value of 0.42 (=0.21+0.21).

Where the word in WT1 that corresponds to the word in WT2 do not equal each other (NO at step S1008), the method 1000 proceeds from step S1008 to step S1012. At step S1012, the word frequency value of each word is added to an intermediate difference total.

The method 1000 returns from step S1010 and step S1012 to step S1006. In the first example where WT1 is ABC Ltd and WT2 is ABC Inc., the second positioned word "Ltd" in WT1 corresponds to the second position word "Inc." in WT2, again resulting in YES at step S1006 for the first example. However, "Ltd" and "Inc." are not equal. That is, "Ltd" in WT1 is different from "Inc." in WT2 (NO at step S1008). Here, the word frequency value for the word "Ltd" listed in FIG. 8, 0.14 (=2/14), and the word frequency value for the word "Inc.", 0.14 (=2/14), are added to the intermediate difference total at step S1012, giving an intermediate difference total of 0.28 (=0.14+0.14) and, from above, an intermediate common total of 0.42 for the first example. From step S1012, the first example where WT1 is ABC Ltd and WT2 is ABC Inc. is processed at step S1006 for a third time. Since WT1 and WT2 do not have a word in the third position of their tokens, the method 1000 proceeds from step S1006 to step S1014 (NO at step S1006).

In the second example where WT1 is MNO Corp and WT2 is ABBC, WT1 position one word "MNO" is not equal to WT2 position one word "ABBC" (NO at step S1008). That is, "MNO" in WT1 is different from "ABBC" in WT2. Here, the word frequency value for the word "MNO" listed in FIG. 8, 0.14 (=2/14), and the word frequency value for the word "ABBC", 0.07 (=1/14), are added to the intermediate difference total at step S1012 to give a value of 0.21 (=0.14+0.07). From step S1012, the second example where WT1 is MNO Corp and WT2 is ABBC is again processed at step S1006. While WT1 has a word in position two, "Corp", WT2 does not have a position two word that corresponds to "Corp". Accordingly, the method 1000 proceeds from step S1006 to step S1014 (NO at step S1006).

On entering step S1014, the intermediate totals for the two examples are in Table II below:

TABLE II

|  | Intermediate Common Total | Intermediate Difference Total |
| --- | --- | --- |
| First example (ABC Ltd & ABC Inc.) | 0.42 | 0.28 |
| Second example (MNO Corp & ABBC) | 0 | 0.21 |

The above step S1006 through step S1012 took into account the sequence/order of each word in each token on a word-by-word basis and the length of each token. Irrespective of the order and length regarding the tokens, steps S1014 and S1016 look at the words in common and the words that are different between the two tokens selected in step S1002.

At step S1014, the method 1000 obtains a common total by adding one word-frequency-value to the intermediate common total for words in WT1 and WT2 that are equal. In the first example where WT1 is ABC Ltd and WT2 is ABC Inc., the tokens have "ABC" in common. From FIG. 8, the frequency value for "ABC" is 0.21 (=3/14). Thus, 0.21 is added to the intermediate common total of 0.42 to give 0.63 (=0.42+0.21) as the common total for the first example. At step S1016, the method 1000 obtains a difference total for the two tokens being processed by adding a word frequency value to the intermediate difference total for each word in WT1 and WT2 that are not equal. In the first example where WT1 is ABC Ltd and WT2 is ABC Inc., the tokens have "Ltd" and "Inc." as different words. The frequency value for "Ltd" (0.14—see FIG. 8) and "Inc." (0.14) are added at step S1016 to the intermediate difference total of 0.28 so that the difference total becomes 0.56 (=0.28+0.14+0.14).

Processing the second example for WT1 and WT2 through steps S1014 and step S1016, WT1 and WT2 for the second example have no words in common and three words that are different: "MNO", "Corp", and ABBC". Adding 0.14, 0.07, and 0.07 to 0.21 results in a difference total of 0.49 (0.50 when rounded up). The resulting Totals are in table III below:

TABLE III

| | Common Total | Difference Total |
|---|---|---|
| First example (ABC Ltd & ABC Inc.) | 0.63 | 0.56 |
| Second example (MNO Corp & ABBC) | 0 | 0.50 |

After proceeding from step S1014 to step S1016, the method 1000 proceeds from step S1016 to step S1018. At step S1018, the method 1000 determines whether the common total is zero. If the common total is zero, then none of the words in the two tokens selected in step S1002 are in common. In such a case, it is desirable that the distance between the two words be great to lessen their influence on the ultimate selection of a token to describe an entity of interest at step S722 in FIG. 7. If the common total is not zero, then it is important that the distance between the two words have more of an influence on the ultimate selection of a token to describe an entity of interest at step S722 in FIG. 7.

If the common total is not equal to zero (NO at step S1018), then the method 1000 proceeds to step S1020. At step S1020, the distance between the two tokens selected at step S1002 is equal to the ratio of the difference total to the common total:

$$\text{Distance}(WT_i, WT_j) = (\text{different})/(\text{common}) \qquad \text{(ii)}$$

In the first example where WT1 is ABC Ltd and WT2 is ABC Inc., the distance between ABC Ltd and ABC Inc. is determined to be 0.89 (=0.56/0.63). The value of 0.89 appears in FIG. 11 where ABC Ltd and ABC Inc. intersect.

If the common total is equal to zero (YES at step S1018), then the method 1000 proceeds to step S1022. At step S1022, the distance between the two tokens selected at step S1002 is equal to the difference total times a constant C (for example, C=100):

$$\text{Distance}(WT_i, WT_j) = (\text{different}) \qquad \text{(iii)}$$

In the second example where WT1 is MNO Corp and WT2 is ABBC, the distance between MNO Corp and ABBC is determined to be 50.00 (=(0.50)*100). The value of 50.00 appears in FIG. 11 where MNO Corp and ABBC intersect.

The method 1000 proceeds from step S1020 and step S1022 to step S1024. At step S1024, the method 1000 determines whether there are any tokens within the list of tokens 330 that have not yet been processed by the method 1000. In this way, method 1000 determines whether any of the distance values of those in FIG. 11 have yet to be determined.

If there are tokens within the list of tokens 330 that have not yet been processed by the method 1000 (YES at step S1024), the method 1000 returns to step S1002 in FIG. 10. If all the tokens within the list of tokens 330 have been processed by the method 1000 (NO at step S1024), the method 1000, and step S714 where the distance between each token is determined, ends. From step S714, the method 700 of FIG. 7 proceeds to step S716.

At step S716, the method 700 clusters each of the tokens in the list of tokens 330 into one or more groups. To achieve this, the method 700 uses an iterative bisecting clustering process to cluster extracted tokens based on their similarity. The process relies on a token-to-token distance measure determined at step S714.

Figure 12:
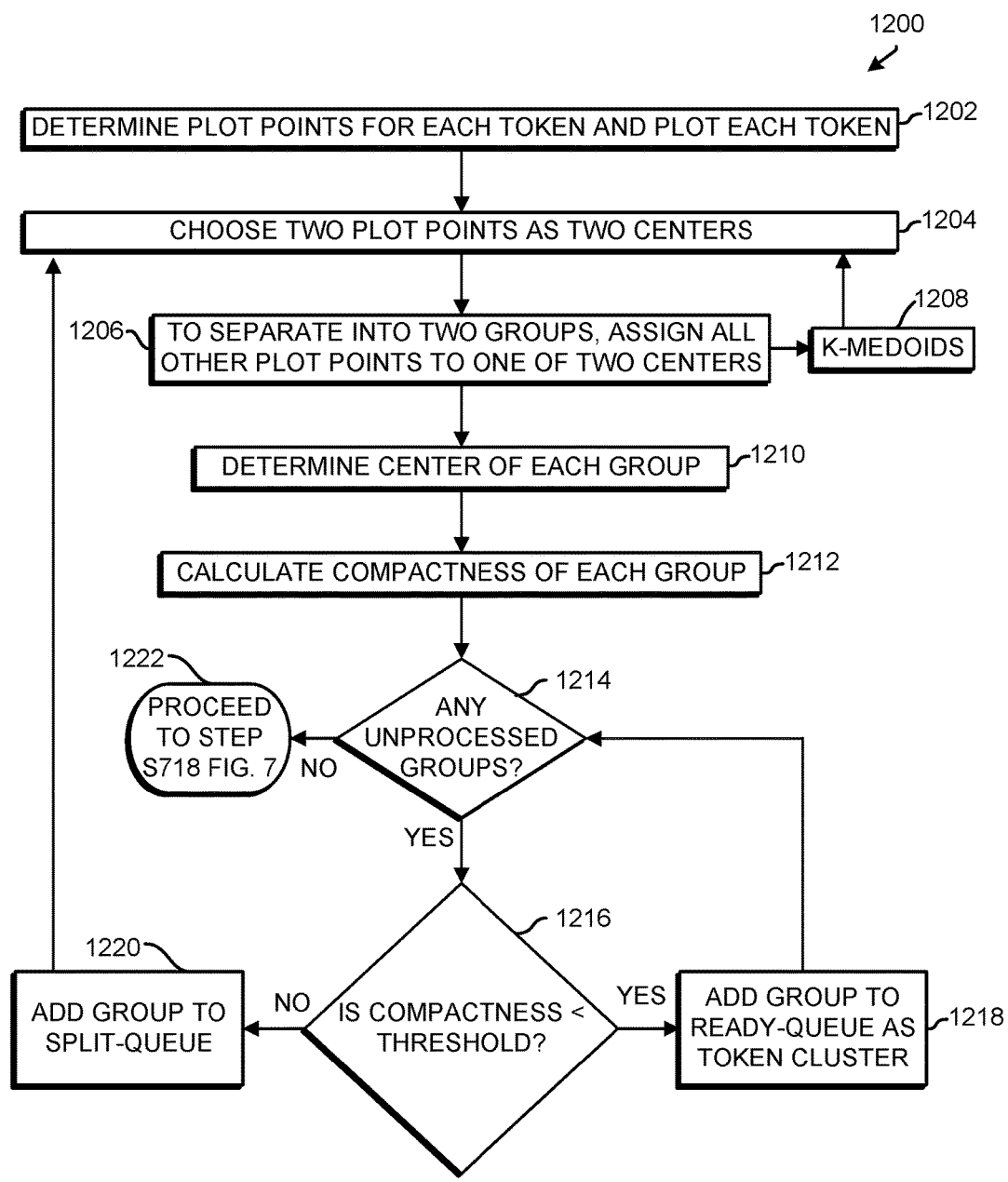
FIG. 12 is a method 1200 to clusters each of the tokens in the list of tokens 330 into one or more groups as part of step S716 of FIG. 7.

FIG. 12 is a method 1200 to clusters each of the tokens in the list of tokens 330 into one or more groups as part of step S716 of FIG. 7. At step S1202, the method 1200 determines plot points for each token that may be used to plot each token on a graph. In a simple example, points may be plotted on a two-dimensional graph where the set of tokens 330 includes only two unique words. In the present example, the list of tokens 330 includes seven unique words: ABBC, ABC, CORP, Inc., Ltd, MNO, and XYZ. Here, each of the nine tokens is located on a seven-dimensional graph.

FIG. 13 illustrates the plot points for the tokens in the list of tokens 330. The top row contains the seven unique words in the list of tokens 330 as seven dimensions. The left-most column contains each of the nine tokens. A frequency value from FIG. 8 representing the frequency of a word in the list of tokens 330 is place at a grid reference where one of the words in the token in the left-most column matches a dimension word in the top-most row of FIG. 13. For example, in the first token row ABBC, the frequency value of 1/14 is placed at the grid reference ABBC-ABBC and zero is placed at the remainder of grid references, giving a plot point coordinate for ABBC of (1/14, 0, 0, 0, 0, 0, 0). For the fourth token row ABC Ltd, 3/14 is placed at the ABC Ltd-ABC grid reference representing the frequency value of ABC and 2/14 is placed at the ABC Ltd-Ltd grid reference representing the frequency value of Ltd. This giving a plot point coordinate for ABC Ltd of (0, 3/14, 0, 0, 2/14, 0, 0). Since there are nine tokens in the list of tokens 330, there are nine plot points.

The method 1200 proceeds from step S1202 to step S1204. At step S1204, the method 1200 chooses two plot points from the nine plot points and identifies each of the two chosen plot points as a center. Here, the centers are chosen from the available points rather than using calculated average points. At step S1206, all remaining plot points are assigned to one of the two centers. This splits the set of tokens into two groups. At step S1208, the k-medoids algorithm is used in an iterative process to bisect all the tokens into the two most compact clusters.

The k-medoids algorithm is a clustering algorithm that breaks a dataset up into groups (partitional) to minimize the distance between points labeled to be in a cluster and a point designated as the center of that cluster. The k-medoids algorithm chooses datapoints as centers (medoids or exemplars) and works with an arbitrary metrics of distances between datapoints. As a partitioning technique of clustering, the k-medoids algorithm clusters the data set of n objects into k clusters known a priori. The k-medoids algorithm is robust to noise and outliers because it minimizes a sum of pairwise dissimilarities.

From step S1208, the method iteratively passes through step S1204, step S1206, and step S1208 until all the tokens of the list of tokens 330 are clustered into the two most compact groups. Once it is determined that all the tokens are clustered into the two most compact groups, the method 1200 proceeds from step S1206 to step S1210. At step S1210, a center of each of the two groups is determined. At step S1212, the method 1200 determines the compactness of each group.

Compactness is a measure of how closely and firmly the tokens in a cluster are united or packed together within a space. If the determined compactness of a group is below a threshold, then the tokens within that group are sufficiently compact to be representative of the same entity of interest. Intra-Cluster distance may measure compactness where the sum of the distances of the objects within the same cluster is minimized. In one example, the distance of the farthest cluster member point is used to determine how well does the cluster center represent its member points. In another example, the method 1200 uses the isoperimetric quotient—the ratio of the area of the shape to the area of a circle (the most compact shape) having the same perimeter—to determine compactness of a group of tokens.

The method 1200 proceeds from step S1212 to step S1214. At step S1214, the method 1200 determines whether there is any unprocessed group. Here, there are two groups and each group is process one at a time.

If there is an unprocessed group (YES at S1214), then the method 1200 proceeds from step S1214 to step S1216. At step S1216, the method 1200 determines whether the compactness for a given group determined at step S1212 is less than a predetermined compactness threshold. The predetermined compactness threshold may be a value, relevant to the technique used to calculate compactness at step S1212, below which a group may be deemed sufficiently compact.

If the compactness for a given group is less than the predetermined compactness threshold (YES at step S1216), the method 1200 proceeds to step S1218. At step S1218, the determined compact group is added to a ready-queue as a token cluster having tokens that are deemed to be representative of the same entity of interest. In other words, if compactness is below a threshold, then the cluster (token center+token points) is added to the ready-queue. The method 1200 returns from step S1218 to step S1214 to determine whether there are any unprocessed groups.

If the compactness for a given group is equal to or greater than the predetermined compactness threshold (NO at step S1216), the method 1200 proceeds from step S1216 to step S1220. At step S1220, the determined uncondensed group is added to a split-queue as a cluster having tokens that are deemed not to be representative of the same entity of interest. This uncondensed group will be returned to processing at step S1204 to eventually be split into two new groups whose compactness is compared to the predetermined compactness threshold at step S1216.

If it is determined at step S1214 that there are no more unprocessed groups (NO at step S1214), the method 1200 proceeds to step S1222. As step S1222, the method 700 of FIG. 7 proceeds from step S716 to step S718. At step S718, a cluster score is determined for each cluster. Other termination conditions for method 1200 can be used, such as stopping the splitting when a predetermined number of clusters have been calculated.

FIG. 14 illustrates token clusters added to the ready-queue at step S1220 and the score for each cluster. The processing of method 1200 coalesced the nine tokens of the list of tokens 330 into four token clusters: (i) ABBC, (ii) ABC, ABC Inc., ABC Ltd, (iii) MNO, MNO Corp, and (iv) XYZ, XYZ Inc., XYZ Ltd. The center for each group is chosen as indicated by a "C=" in FIG. 14. For group No. (ii) for example, ABC was chosen as the center since the word is the most common out of all the words in the tokens in that token cluster.

Once the all of the tokens have been clustered at step S716 of FIG. 7 using the proposed distance measure, each cluster is scored at step S718 in order to produce a ranked list of resolved Entities. The cluster score at step S718 may be determined using the following:

$$ClusterScore(CS) = \sum_{i=1}^{count} \frac{TokenScore(TS_i)}{(1 + Distance(T, C))} \quad \text{(iv)}$$

where the count represents one for each token in the token cluster, the TokenScore is the score for each token from FIG. 9, and the Distance (Dist) is the distance between a token T and the center token C of the token cluster from FIG. 11. Here, a particular cluster score is calculated by summing up all of the token scores of the tokens belonging to a particular cluster, which are scaled by their distance from the center. The determined score for each of the four token clusters is as illustrated in FIG. 14.

Once all of the clusters have been scored in step S718, the next steps are to rank the clusters and choose the best representing feature token or (extracted Entity) to represent the cluster. From step S718 of FIG. 7, the method 700 proceeds to step S720 to rank the clusters based on their cluster scores. In the example using the list of tokens 330 in FIG. 5, token cluster (ii) of FIG. 14 has the cluster score of 0.41, which is the largest of the four cluster scores. In the example, the ranking of the token clusters is (ii), (iv), (iii), and then (i).

From step S720, the method 700 proceeds to step S722. At step S722, the best representative token in each token cluster to describe an entity of interested is selected. One approach is to choose the cluster center (C). However, choosing a highest ranked token (highest score/count) from the set of tokens belonging to a particular cluster produced better results. In this example, ABC Inc. received a score of 0.9 from extractor 306 (FIG. 4), ABC received a score of 0.5 from extractor 310, and ABC Ltd received a score of 0.4 from extractor 308. With a score of 0.9, ABC Inc. is chosen at step S722 to be the token to describe token cluster (ii). In the example, the ranked entity of interest recommendation result is 1) ABC Inc., 2) XYZ Inc., 3) MNO, and 4) ABBC. In this case, the entity of interest is the outside party to a contract (where the inside party to the contract is known by the operators of the extractor set 304). This ranked result may be displayed to a user in a pull-down menu. As the highest ranked entity of interest recommendation, a user may select ABC Inc. to populate the field "Outside Party to Contract" field in a table that is displayed as a page on the display apparatus 106 or the field automatically be populated by the highest ranked entity of interest recommendation.

In the example methods for picking "best" Named Entity given a set of extracted entities extracted from single or multiple named entity extractors, some embodiments use one or more functional units to implement the above-described devices, systems, and methods. The functional units may be implemented in only hardware (e.g., customized circuitry) or in a combination of software and hardware (e.g., a microprocessor that executes software). Moreover, the scope of the claims is not limited to the above-described embodiments and includes various modifications and equivalent arrangements. In addition, as used herein, the conjunction "or" generally refers to an inclusive "or," though "or" may refer to an exclusive "or" if expressly indicated or if the context indicates that the "or" must be an exclusive "or."

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

What is claimed is:

1. A method to be performed by an information processing apparatus to select a token from a document to describe a field of interest in the document, the method comprising:
    obtaining a list of tokens output from a plurality of extractors that received the document as an input, wherein each output token has an extractor score assigned by an extractor of the plurality of extractors;
    determining, as a word frequency value, a frequency of each word in the list of tokens, a token score for each token in the list of tokens, and a distance between each token in the list of tokens;
    clustering each token in the list of tokens into a plurality of groups;
    determining a cluster score of each group, wherein the cluster score of a group is determined by dividing a token score for a first token in the group by one plus a distance between the first token and a center token of the group; and
    selecting, based on the determined cluster score of each group, a token with a group of the plurality of groups to describe the field of interest in the document.

2. The method according to claim 1, wherein determining the token score of a first token includes multiplying an extractor score by a sum of word frequency values for the first token.

3. The method according to claim 1, wherein determining the distance between two tokens includes taking word sequence/order into account and dividing a sum of word frequency values of words that are different between the two tokens by a sum of word frequency values of words that are common between the two tokens.

4. The method according to claim 1, wherein determining the distance between two tokens includes multiplying a constant value and a sum of word frequency values of words that are different between the two tokens.

5. The method according to claim 1, wherein clustering each token in the list of tokens includes determining whether a compactness of a group in the plurality of groups is less than a predetermined compactness threshold.

6. The method according to claim 5, wherein, in a case where the compactness of a first group is greater than the predetermined compactness threshold, clustering includes dividing the first group into two groups.

7. A non-transitory computer-readable storage medium storing a program to cause an information processing apparatus to perform a method to select a token from a document to describe a field of interest in the document, the method comprising:
    obtaining a list of tokens output from a plurality of extractors that received the document as an input, wherein each output token has an extractor score assigned by an extractor of the plurality of extractors;
    determining, as a word frequency value, a frequency of each word in the list of tokens, a token score for each token in the list of tokens, and a distance between each token in the list of tokens;
    clustering each token in the list of tokens into a plurality of groups;
    determining a cluster score of each group, wherein the cluster score of a group is determined by dividing a token score for a first token in the group by one plus a distance between the first token and a center token of the group; and
    selecting, based on the determined cluster score of each group, a token with a group of the plurality of groups to describe the field of interest in the document.

8. An information processing apparatus to select a token from a document to describe a field of interest in the document, the information processing apparatus comprising:
    an obtaining unit configured to obtain a list of tokens output from a plurality of extractors that received the document as an input, wherein each output token has an extractor score assigned by an extractor of the plurality of extractors;
    a determining unit configured to determine, as a word frequency value, a frequency of each word in the list of tokens, a token score for each token in the list of tokens, and a distance between each token in the list of tokens;
    a clustering unit configured to cluster each token in the list of tokens into a plurality of groups;
    a cluster score determining unit configured to determine a cluster score of each group, wherein the cluster score of a group is determined by dividing a token score for a first token in the group by one plus a distance between the first token and a center token of the group;

a selecting unit configured to select, based on the determined cluster score of each group, a token with a group of the plurality of groups to describe the field of interest in the document; and at least one processor coupled to a memory, wherein the at least one processor implements the obtaining unit, the determining unit, the clustering unit, and the selecting unit.

* * * * *